United States Patent [19]

Moore

[11] Patent Number: 4,557,975

[45] Date of Patent: Dec. 10, 1985

[54] PHOTOCURABLE ACRYLATE-ACRYLONITRILE COATED PLASTIC ARTICLES

[75] Inventor: James E. Moore, Mt. Vernon, Ind.

[73] Assignee: General Electric Company, Pittsfield, Mass.

[21] Appl. No.: 566,977

[22] Filed: Dec. 30, 1983

[51] Int. Cl.[4] ................................................ B05D 3/06
[52] U.S. Cl. .................................. 428/412; 427/54.1; 204/159.22
[58] Field of Search ....................... 427/54.1; 428/412; 204/159.22

[56] References Cited

U.S. PATENT DOCUMENTS 3,968,305  9/1974  Oshima et al. ....................... 428/334
4,319,811  3/1982  Tu et al. ............................... 351/166

OTHER PUBLICATIONS

Kushner et al., "New Coatings are Radiation Curable and Abrasion Resistant", *Modern Plastics*, Apr. 1983, pp. 87–92.

*Primary Examiner*—John H. Newsome
*Attorney, Agent, or Firm*—John W. Harbour; William F. Mufatti; Edward K. Welch, II

[57] ABSTRACT

Polymeric substrates, especially the polycarbonates, are coated with a photocurable coating mixture containing polyfunctional acrylates, acrylonitriles, and a photoiniator to produce scratch- and mar-resistant polymeric articles.

11 Claims, No Drawings

PHOTOCURABLE ACRYLATE-ACRYLONITRILE COATED PLASTIC ARTICLES

This invention relates to a plastic article having a photocured protective coating thereon which coating possesses exemplary scratch-, mar-, and solvent-resistant, has good adhesion to the plastic substrate and is compatible witbh the substrate.

Particularly, this invention relates to plastic articles coated with a photocured protective coating comprised of the photo-reaction products of certain polyfunctional acrylate ester monomers or mixtures thereof and certain acrylonitrile based compounds. Additionally, this invention relates to the method for producing such articles and the coating composition used to form the protective coating.

BACKGROUND

In the past years, plastics have become commercially vital materials used in a wide range of applications. Particularly, plastics may be applied as transparent articles, as translucent articles, or to opaque surfaces to provide texture, shine, and durability. Generally, these applications require a high degree of scratch- and mar-resistance in addition to other required properties, for example, impact strength, tensile strength, or elongation.

To date, no plastic exists which can be made to possess all desirable properties in the desirable proportions. Therefore, a laminations and coatings technology has developed which allows the joining of plastic materials and thereby a joining of their desirable properties. For example, the laminations and coatings technology may be used to join a substrate possessing high impact resistance, tensile strength, non-opacity, and elongation resistance, such as for example, polycarbonate, with an outer surface layer possessing high scratch-resistance, mar-resistance, and low susceptibility to attack by solvents, such as for example, cross-linked polyacrylates, to produce a single article possessing the structural strength of the polycarbonates and the resistance to surface attack of the cross-linked polyacrylates.

Many prior art laminations and coatings efforts have been unsuccessful for a variety of reasons. Some are unsuccessful due to the incompatibility of the laminae or coating materials with the plastic substrate. Some may be judged unsuccessful by their failure to impart the required degree of a particular desirable property to the substrate. Others may be replaced by the development of new and more desirable coatings or laminates.

The replacement of known coatings by a new development in the art is particularly likely in the area of providing scratch- and mar-resistance to a plastic substrate. Scratch- and mar-resistance are always desirable in greater degree for the uses in which they are necessary, for example, to increase the useful life of a transparent plastic article, the decorative qualities of a translucent plastic article, or the shine of an opaque plastic surface.

The prior art scratch- and mar-resistant coatings for plastic substrates, such as, the polycarbonates have included organopolysiloxanes, U.S. Pat. No. 3,707,397; polyester-melamines or acrylic-melamines, U.S, Pat. No. 3,843,390; and allyl resins, U.S. Pat. No. 2,332,461. These types of prior art coatings generally involve a thermal curing process which is expensive and creates problems with warpage.

U.S. Pat. No. 3,968,305 describes a synthetic shaped article having a mar-resistant polymer surface layer integrated with the polymer surface body, said polymer surface layer consisting essentially of, in polymerized form, (a) 20 to 100 weight percent of a compound having a total of at least three acryloxy and/or methacryloxy groups linked with a straight chain aliphatic hydrocarbon residue having not more than 20 carbon atoms, (b) 0 to 80 weight percent of at least one copolymerizable mono- or diethylenically unsaturated compound. This type of a surface layer suffers from the fact that it generally has poor durability of adhesion after prolonged exposure to weathering.

U.S. Pat. No. 3,968,309 describes a molded article of plastic having on its surface a cured film of a coating material comprising at least 30% by weight of at least one polyfunctional compound selected from the group consisting of polymethacryloxy compounds having a molecular weight of 250 to 800 and containing at least three acryloyloxy groups in the molecule. This patent also teaches that the coating must contain from 0.01% to 5% by weight of a fluorine-containing surfactant in order for the coated article to be acceptable.

Although scratch- and mar-resistance are enhanced, an even greater degree of such protection is desirable.

U.S. Pat. No. 4,198,465 discloses a plastic substrate, preferably a polycarbonate, having adhered thereto a durably adherent mar-, scratch-, and chemical-resistant UV cured coating comprised of the photo-reaction products of a photoinitiator, resorcinol monobenzoate, and a mixture of polyfunctional acrylate monomers. While the coating of this disclosure provides scratch-, mar-, and abrasion-resistance, the useful life of many plastic articles can be increased with more such protection.

U.S. Pat. No. 4,319,811 discloses an invention relating to a radiation curable coating which provides abrasion- and chemical-solvent resistance. The coating is a comonomer having a first monomer selected from the group consisting of the triacrylates and tetracrylates mixed with a second monomer having an N-vinyl imido group, preferably an N-vinyl lactam, such as N-vinyl pyrrolidone or N-vinyl caprolactam. A photoinitiator, for example (p-phenoxy)dichloroacetophenone or dimethoxyphenyl acetophenone, is included in the photocurable mixture. A greater degree of scratch- and mar-resistance is desirable than is provided by this coating.

It is now been found that a photocurable coating composition containing a comonomer of certain specific polyfunctional acrylates and a second comonomer of certain substituted or unsubstituted acrylonitriles provides superior and durable UV cured coatings for plastic substrates. Thus, the present invention provides comonomer based UV cured coatings for application to transparent plastic articles, transluscent plastic articles, or opaque plastic surfaces, which adhere tenaciously and durably to the substrate, are compatible with the substrate, are mar-, scratch-, and solvent-resistant, and are not deleteriously affected after prolonged exposure to weathering.

DESCRIPTION

In accordance with the present invention there is provided a plastic article having deposited on the surface thereof an adherent mar-, scratch-, and chemical-resistant non-opaque coating. The coating contains the photo-reacted comonomers of at least one UV curable polyfunctional acrylate monomer, at least one UV curable substituted or unsubstituted acrylonitrile monomer, and a photoinitiator. Other constituents may optionally be added.

The polyfunctional acrylate ester monomers are represented by the general formula:

$$(H_2C=CH-CO-O)_nR \quad (1)$$

wherein n is an integer from 2 to 8, preferably from 2 to 6, and more preferably from 2 to 4; and R is selected from n valent hydrocarbon residues, n valent substituted hydrocarbon residues, n valent hydrocarbon residues containing at least one ether linkage, and n valent substituted hydrocarbon residues containing at least one ether linkage.

Preferred n valent hydrocarbon residues are the n valent aliphatic, preferably saturated aliphatic, hydrocarbon residues containing from 1 to about 20 carbon atoms and the n valent aromatic hydrocarbon residues containing from 6 to about 10 carbon atoms.

Preferred n valent hydrocarbon residues containing at least one ether linkage are the n valent aliphatic hydrocarbon residues, preferably saturated aliphatic hydrocarbon residues, containing from 1 to about 5 ether linkages and from 2 to about 20 carbon atoms.

Preferred n valent substituted hydrocarbon residues are the n valent aliphatic hydrocarbon residues, preferably the saturated aliphatic hydrocarbon residues, containing from 1 to about 20 carbon atoms and the n valent aromatic hydrocarbon residues containing from 6 to 10 carbon atoms. The added groups may be groups such as; the halogens, for example fluorine, chlorine, bromine and iodine; hydroxyl; —COOH; and —COOR' groups, wherein R' represents alkyl groups containing from 1 to about 6 carbon atoms.

Preferred n valent substituted hydrocarbon residues containing at least one ether linkage are the n valent aliphatic hydrocarbon residues, preferably saturated aliphatic hydrocarbon residues, containing from 2 to about 20 carbon atoms and from 1 to about 5 ether linkages. The added substituent groups may be, for example, halogen, hydroxyl, —COOH, and —COOR' groups wherein R' is as defined above.

It is to be understood that where substituent groups are present, they should not unduly hinder or interfere with the photocure of the polyfunctional acrylic monomers.

The more preferred polyfunctional acrylic monomers are those represented by Formula 1, above, wherein R is an n valent saturated aliphatic hydrocarbon residue containing from 1 to about 20 carbon atoms, a hydroxyl substituted n valent saturated aliphatic hydrocarbon residue containing from 1 to about 20 carbon atoms, an n valent saturated aliphatic hydrocarbon residue containing from 2 to about 20 carbon atoms and from 1 to about 5 ether linkages, and a hydroxyl substituted n valent saturated aliphatic hydrocarbon residue containing from 2 to about 20 carbon atoms and from 1 to 5 ether linkages.

Although the coating compositions may contain one or more of said polyfunctional acrylate monomers, the most preferred coating compositions contain only the triacrylate, wherein n in Formula 1 is 3. The preferred triacrylate is pentaerythritol triacrylate (PETA) which is compound 25 in Table I.

Illustrative of suitable polyfunctional acrylate ester monomers of Formula 1 are those listed below in Table I.

TABLE I

Diacrylates of Formula I

1. $CH_2=CHOO-CH_2-OOCCH=CH_2$
2. $CH=CHCOO-CH_2-CH_2OOCCH=CH_2$
3. $CH_2=CHCOO-CH_2-CHOHCH_2OOCCH=CH_2$
4. $CH_2=CHCOO-(CH_2)_6-OOCCH=CH_2$

5. $CH_2=CHCOO-CH_2=CH_2-CH-CH_3$
   $\phantom{CH_2=CHCOO-CH_2=CH_2-CH-}OOCH=CH_2$ 6. $CH_2=CHCOO-CH_2CH_2OCH_2CH_2-OOCCH=CH_2$
7. $CH_2=CHCOO-CH_2CH_2OCH_2CH_2OCH_2CH_2OCH_2CH_2-$
   $\phantom{CH_2=CHCOO-CH_2CH_2OCH_2CH_2OCH_2CH_2OCH_2CH_2-}OOCCH=CH_2$ 8. $CH_2=CHCOO-CH_2-\underset{\underset{CH_3}{|}}{\overset{\overset{CH_3}{|}}{C}}-OOCCH=CH_2$ 9. $CH_2=CHCOO-CH_2-\underset{\underset{CH_3}{|}}{\overset{\overset{CH_2Br}{|}}{C}}-OOCCH=CH_2$ 10. $CH=CHCOO-CH-\underset{\underset{CH_3}{|}}{\overset{\overset{CH_2OH}{|}}{C}}-OOCCH=CH_2$ 11. $CH_2=CHCOO-CH_2-\underset{\underset{CH_2OH}{|}}{\overset{\overset{CH_2OH}{|}}{C}}-OOCCH=CH_2$ 12. $CH_2=CHCOO-CH_2-\underset{\underset{CH_2Br}{|}}{\overset{\overset{CH_2OH}{|}}{C}}-OOCCH=CH_2$

13. $CH_2=CHCOO-CH_2-CH=CH-CH_2=CH_2-OOCCH=CH_2$

14. $CH_2=CHCOO-CH_2-CH=CH-\underset{\underset{CH_2OH}{|}}{CH}-OOCH=CH_2$

15. $CH_2=CHCOO-CH_2-\underset{\underset{CH_2Cl}{|}}{\overset{\overset{CH_2OH}{|}}{C}}-CH_2OOCCH=CH_2$ 16. $CH_2=CHCOO-CH_2-\underset{}{\overset{\overset{OCH_3}{|}}{CH}}-CH_2-OOCCH=CH_2$ 17. 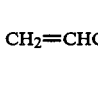

18. 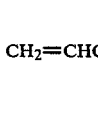

19. 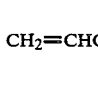

TABLE I-continued

20. CH₂=CHCOO—⟨C₆H₄⟩—OOCCH=CH₂

21. CH₂=CHCOO—CH₂CHCH₂—OOCCH=CH₂

Triacrylates of Formula 1

22.
$$CH_2=CHCOO-CH_2CH_2CH_2\overset{\overset{\displaystyle OOCCH=CH_2}{|}}{CH}-OOCCH=CH_2$$

23.
CH₂=CHCOO—CH₂
CH₂=CHCOO—CH₂—C—CH₂=CH₂
CH₂=CHCOO—CH₂

24.
$$CH_2=CH-COO-CH_2-\overset{\overset{\displaystyle CH_3}{|}\overset{\displaystyle CH_2}{|}}{\underset{\underset{\displaystyle CH_2-COO-CH=CH_2}{|}}{C}}-CH_2-OOC-CH=CH_2$$

25.
$$CH_2=CHCOO-CH_2-\overset{\overset{\displaystyle CH_2OH}{|}}{\underset{\underset{\displaystyle CH_2-OOCCH=CH_2}{|}}{C}}-CH_2OOCCH=CH_2$$

26. CH₂=CHCOO—⟨C₆H₃(OOCCH=CH₂)⟩—OOCCH—CH₂

Tetraacrylates of Formula 1

27.
CH₂=CHCOO—CH₂
CH₂=CHCOO—CH₂—C—CH₂OOCCH=CH₂
CH₂=CHCOO—CH₂

28.
CH₂=CHCOO—CH₂—CH—CH—CH₂—OOCCH=CH₂
CH₂=CHOO—H₂C    CH₂—OOCCH=CH₂

29.
CH₂=CHCOO—CH₂CHCH₂—CH₂CH—OOCCH—CH₂
CH₂CHCOO—CH₂    CH₂—OOCCH=CH₂

The polyacrylate esters and their production are well known to those skilled in the art. One method of producing the di-, tri-, and tetra-acrylate esters involves reacting acrylic acid or acrylyl halide with a di-, tri-, or tetra-hydroxyl compound to produce the diester, triester or tetraester. Thus, for example, acrylic acid can be reacted with ethylene glycol to produce ethylene glycol diacrylate which is compound 2 in Table I.

The substituted or unsubstituted acrylonitrile monomers are represented by the general formula:

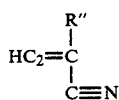

wherein R″ is hydrogen, a halogen, a monovalent hydrocarbon radical, or a monovalent substituted hydrocarbon radical.

Preferred monovalent hydrocarbon radicals are the monovalent aliphatic, preferably saturated aliphatic, hydrocarbon residues containing from 1 to 3 carbon atoms. Preferred monovalent substituted hydrocarbon radicals are the monovalent aliphatic, preferably saturated aliphatic, hydrocarbon residues containing from 1 to about 3 carbon atoms, which may containing substituent groups such as; the halogens; hydroxyl; —COOH; and COOR‴ groups, wherein R‴ represents an alkyl group of 1 or 2 carbon atoms.

Unsubstituted acrylonitrile may be obtained by any known and convenient means. Commercially, acrylonitrile is manufactured by any one of three viable methods, including, the addition of hydrogen cyanide to acetylene; the addition of hydrogen cyanide to ethylene oxide to produce ethylene cyanohydrin, which is dehydrated; and the addition of ammonia to propylene in the presence of oxygen and a catalyst. The manufacture of the substituted acrylonitriles is also well known. For example, methacrylonitrile may be produced by vapor-phase catalytic oxidation of methallylamine, U.S. Pat. No. 2,375,016; by dehydration of methacrylamide, U.S. Pat. No. 2,373,190; and from isopropylene oxide and ammonia, U.S. Pat. No. 2,557,703.

The unsubstituted acrylonitrile wherein R″ is hydrogen is most preferred. Thus, acrylonitrile and pentaerythritol triacrylate are the most preferred comonomers.

The photoinitiators of the present invention may be at least one of the many known to the art as suitable to effect free radical photoinitiation. For example, dibutoxyacetophenone, clorinated benzophenone, aryl ketone, benzophenone, diethylethanol amine, 2-chlorothioxanthone, diethoxyacetophenone, mixed benzoin ether, or benzoin methyl ether, are suitable. Preferably, the initiator is dimethoxyacetophenone or (p-phenoxy)-dichloroacetophenone.

In the preparation of the coating of the present invention, the acrylonitrile based monomer is mixed with at least one polyfunctional acrylate ester monomer and at least one photoinitiator to form a coating mix. The composition of the coating mix requires: a weight ratio of acrylonitrile to polyfunctional acrylate between about 1/100 to about 5/1; and an amount of photoinitator effective to produce the photocure of the coating composition, preferably in a weight ratio to both acrylonitrile and polyfunctional acrylate ester of from about 1/400 to about 1/20.

Optionally, the coating mix may be compounded with at least one latent UV light absorber. Suitable latent UV light absorbing compounds are well known in the art, with the preferred latent UV light absorber being resorcinol monobenzoate. Generally, the latent UV light absorber may be added in a weight ratio to coating mix of from about 1/100 to about ¼ and preferably from about 1/30 to about 1/6. The addition of a latent UV light absorbing compound makes the article less susceptible to photodegradation.

The coating mix of the instant invention may also optionally be compounded with various flatting agents, thixotropic agents, and dyes. All of these additives and the use thereof are well known in the art and do not require extensive discussion. It is understood that any compounds possessing the ability to function in such a manner, that is, as a flatting agent and the like, can be used so long as they do not deleteriously affect the photocuring of the coating compositions and do not adversely affect the transparent and protective character of the coating.

The coating of the present invention can be applied to any polymeric substance, however, it is preferable that the article or substrate be comprised of polycarbonate. The preferred polycarbonates are unbranched or branched homopolymers and copolymers and mixtures thereof that are prepared by reacting a dihydric phenol with a carbonate precursor. Typical of some of the dihydric phenols that may be employed to make the substrates of this invention are (2,2-bis(4-hydroxyphenyl)propane), bis(4-hydroxyphenyl)methane, 2,2-bis(4-hydroxy-3-methylphenyl)propane, 3,3-bis(4-hydroxyphenyl)pentane, 2,2-bis(3,5-dichloro-4-hydroxyphenyl)-propane, 2,2-bis(3-5-dibromo-4-hydroxyphenyl)propane, bis(3-chloro-4-hydroxyphenyl)propane, bis(3-chloro-4-hydroxyphenyl)methane. Other dihydric phenols of the bisphenol type are also available and are disclosed in U.S. Pat. Nos. 2,999,835 and 3,334,154.

In addition to using a single dihydric phenol, it is possible to employ two or more different dihydric phenols or a copolymer of a dihydric phenol with a glycol or with hydroxy or acid terminated polyester, or with a dibasic acid in the event of carbonate copolymer or interpolymer rather than a homopolymer is desired for use as a substrate. Also employed in the practice of this invention may be blends of any of the above materials to provide the polycarbonate substrate.

The carbonate precursor used to make typical polycarbonate substrates may be either a carbonyl halide, a carbonate ester or a haloformate. Specific carbonate precursors are well known in the art. Carbonyl chloride, also known as phosgene, is preferred.

Also included herein are the polymeric derivatives of a dihydric phenol, a dicarboxylic acid, and carbonic acid. These are disclosed in U.S. Pat. No. 3,169,121 which is incorporated herein by reference.

The polycarbonates as a class of compounds and their manufacture are well known and recognized by those experienced in the art. The polycarbonates heretofore mentioned are for the sake of example only and are not to be construed as limiting the scope of this invention. More detailed examples of polycarbonates are found in U.S. Pat. Nos. 3,153,008, 3,028,365, and 3,021,305 which are incorporated herein by reference.

In the practice of the present invention, the photocurable coating mix is first compounded by adding together the polyfunctional acrylic monomers or mixtures thereof, the substituted or unsubstituted acrylonitriles, the photoinitiator, and, optionally, any of the other previously mentioned additives. Additionally, if it is desirable to reduce the viscosity of the coating formulation, an organic solvent, such as an alcohol, may be incorporated into the formulation. Generally, the amount of solvent present, if any, should be such that evaporation of the solvent occurs before any deleterious effect develops on the substrate due to the aggressiveness (in the chemical etching sense) of the coating composition.

The various components are thoroughly mixed so as to form a generally homogeneous coating composition. The composition is then applied onto the substrate surface by any of the known means such as dipping, spraying, roll-coating and the like. Though the thickness of the coating is not critical, a uniform coating of from about 0.05 mil to about 5 mil is preferred. The coating is cured in an inert, e.g., nitrogen atmosphere, by UV irradiation which can have a wavelength of from 1849 A. to 4000 A. The lamp systems used to generate such radiation may be an ultraviolet lamp which can consist of discharge lamps, as for example, xenon, metallic halide, matallic arc, such as low or high pressure mercury vapor discharge lamp, etc., having operating pressures of from as low as a few milli-torr up to about 10 atmospheres. By curing is meant both the copolymerization of the polyfunctional acrylic monomers and acrylonitrile and the cross-linking of the polymers to form hard, non-tacky coatings.

Samples were prepared for abrasion resistance comparison. The preparation of the various samples required the steps of: weighing and mixing the comonomers and a photoinitiator to form the coating mix; applying the coating mix to the polycarbonate substrate; and curing the coating mix to form the protective hard coat. Not all samples were within the scope of the invention.

The photoinitiator, (p-phenoxy)dichloroacetophenone sold under the Trademark, Sandoray 1000 by Sandox Corporation was used to prepare each sample. In all compositions, three parts by weight of photoinitiator was added to 97 parts by weight of the comonomer mixture.

The coating mix was applied by a wire wound bar and was air dried before being passed through a Linde medium pressure lamp UV cure oven at about 50 foot/minute under a blanket of nitrogen. The resultant coating was transparent and smooth.

The following Tables II and III show the abrasion resistance given to a polycarbonate substrate by the various prepared protective coatings. The coating mix applied to each sample contains the two comonomers in the weight ratios shown. The results of two abrasion tests are shown for each sample. The two abrasion tests chosen to compare the samples were the Taber Abrasion Test, ASTM D 1044-78, and the RCA Abrasion Test performed with a Norman's Abrasion Wear Tester manufactured by Norman Tool and Stamping Company of Evansville, Ind.

The Taber Abrasion Test is a measure of abrasive damage as judged by that percentage of transmitted light which in passing through an abraded track deviates from the incident beam by forward scattering. Tables II and III report the percentage

TABLE II

| SAMPLE | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| Pentaerythritol Triacrylate (PETA) | 9 | 8 | 7.5 | 7 | 6 | 5 | 9 | 8 | 7 | 6 | 5 | 9 | 8 | 7 | 6 | 5 | 9 | 8 | 7 | 6 | 5 |
| Acrylonitrile (AN) | 1 | 2 | 2.5 | 3 | 4 | 5 | | | | | | | | | | | | | | | |
| Hexanediol Diacrylate (HDDA) | | | | | | | 1 | 2 | 3 | 4 | 5 | | | | | | | | | | |
| n-Butyl Acrylate (BA) | | | | | | | | | | | | 1 | 2 | 3 | 4 | 5 | | | | | |
| N—vinyl | | | | | | | | | | | | | | | | | 1 | 2 | 3 | 4 | 5 |

TABLE II-continued

| SAMPLE | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| Prollidone (NVP) | | | | | | | | | | | | | | | | | | | | | |
| Taber Abrader | 2 | 2 | 2 | 1 | 2 | 2 | 1 | 2 | 2 | 3 | 3 | 2 | 2 | 4 | 6 | 7 | 2 | 3 | 4 | 4 | 7 |
| RCA Abrader | 100 | 100 | 100 | 100 | 100 | 100 | 60 | 30 | 30 | 30 | 20 | 80 | 20 | 10 | 20 | 10 | 60 | 80 | 100 | 100 | 100 |

TABLE III

| SAMPLE | A | B | C | D | E | F | G | H | I | J | K | L | M | N | O | P | Q | R | S | T |
|---|---|---|---|---|---|---|---|---|---|---|---|---|---|---|---|---|---|---|---|---|
| Trimethylolpropane Triacrylate (TMPTA) | 90 | 80 | 70 | 60 | 50 | 90 | 80 | 70 | | 60 | 50 | 90 | 80 | 70 | 60 | 50 | 90 | 80 | 70 | 60 | 50 |
| Acrylonitrile (AN) | 10 | 20 | 30 | 40 | 50 | | | | | | | | | | | | | | | | |
| Hexanediol Diacrylate (HDDA) | | | | | | 10 | 20 | 30 | | 40 | 50 | | | | | | | | | | |
| n-Butyl Acrylate (BA) | | | | | | | | | | | | 10 | 20 | 30 | 40 | 50 | | | | | |
| N—vinyl Pyrollidone (NVP) | | | | | | | | | | | | | | | | | 10 | 20 | 30 | 40 | 50 |
| Taber Abrader | 2.3 | 3.5 | 2.6 | 6.6 | 9.0 | 2.6 | 1.8 | 8.3 | >10 | >10 | 1.3 | 4.1 | 4.7 | 7.1 | 7.5 | 1.5 | 2.6 | 5.3 | 7.5 | 7.2 |
| RCA Abrader | 20 | 20 | 20 | 70 | 100 | 20 | 20 | 10 | <10 | <10 | 40 | 20 | 20 | 10 | 40 | 40 | 100 | 40 | 10 | 10 | of the transmitted light that is scattered by the single abraded specimen. An abrasion of 100 cycles with a 500 gram load was used for each specimen.

The RCA Abrasion Test is a measure of abrasive damage as judged by the number of repetitive abrasive strokes required to produce a visibly marred surface. An abrasive stroke is carried out by drawing an abrasive strip against the surface of a test sample under a 275 gram load at constant speed for a set time. Additional information concerning the RCA Abrasion Test can be obtained from the Norman Tool and Stamping Company of Evansville, Ind. The number of repetitive cycles required to produce visible marring on each sample is disclosed in Tables II and III. The abrader was set in a standard cycle abrading mode and 11/16 inch wide, unoiled, paper sold by Norman Tool and Stamping Company of Evansville, Ind. was used as the abrasive medium.

Table II gives the abrasion resistance of several comonomer mixtures of pentaerythritol triacrylate. Samples A-F fall within the scope of the present invention. Samples G-U do not fall within the scope of this invention and are for comparison purposes. The acrylonitrilepentaerythritol triacrylate comonomer mix provides superior abrasion resistance to the substrate as compared to other comonomer mixtures involving pentaerythritol triacrylate.

Table III reveals a similar comparison of comonomer mixtures involving trimethylol propane triacrylate. Samples A-E fall within the scope of the disclosed invention and samples F-T are for comparison. Generally, samples F-T exhibit a lesser abrasion resistance when compared to the acrylonitrile-trimethylolpropane triacrylate comonomer.

Although specific embodiments of the invention have been described, it should not be limited to the particular compositions and articles described herein, but is intended to include all modifications that may be made which, pursuant to the patent statues and laws, do not depart from the spirit and scope of the invention.

I claim:

1. A transparent, scratch-resistant, coating composition for application to plastic substrates which coating composition comprises:
    (i) an amount of photoinitiator effective to initiate the photocure of said composition upon exposure to ultraviolet light;
    (ii) pentaerythritol triacrylate; and
    (iii) at least one acrylonitrile of the general formula

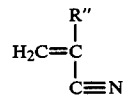

wherein R" is selected from the group consisting of a hydrogen, halogen, and aliphatic hydrocarbon containing up to 3 carbons, to form a composition having a weight ratio of acrylonitrile to polyfunctional acrylate between about 1/100 to about 5/1.

2. The composition of claim 1 wherein said photoinitiator is selected from the group consisting of (dimethoxyphenyl)acetophenone and (p-phenoxy)dichloroacetophenone.

3. The composition of claim 1 wherein said R" is hydrogen.

4. An article having improved abrasion resistance comprising a plastic substrate coated with an ultraviolet light cured coating comprising the photoreaction products of:
    (i) a photoinitiator;
    (ii) pentaerythritol triacrylate; and
    (iii) at least one acrylonitrile of the general formula:

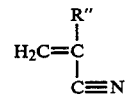

wherein R" is selected from the group consisting of a hydrogen, halogen, and aliphatic hydrocarbon containing up to 3 carbons, to form a composition having a weight ratio of acrylonitrile to polyfunctional acrylate between about 1/100 to about 5/1.

5. The article of claim 4 wherein the coating has a thickness of from about 0.05 mil to about 5 mil.

6. The article of claim 4 wherein said R" is hydrogen.

7. The article of claim 4 wherein said plastic substrate is polycarbonate.

8. The method for providing a mar resistant, tenaciously and durably adhered, hard coating onto the surface of a plastic substrate comprising the steps of:
    (i) coating the plastic substrate with a composition comprising: (a) pentaerythritol triacrylate; (b) a photoinitiator, and (c) acrylonitrile of the general formula

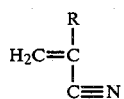

wherein R" is selected from the group consisting of a hydrogen, halogen, and aliphatic hydrocarbon containing up to 3 carbons in a weight ratio of about 1/100 to about 5/1 to said polyfunctional acrylate monomer; and (ii) photo-curing the resultant coating, thereby forming said hard coating.

9. The method of claim 8 wherein said resultant coating of said coating step is applied to a thickness sufficient to form a cured coating of from about 0.05 mil to about 5 mil in thickness.

10. The method of claim 8 wherein said R" is hydrogen.

11. The method of claim 8 wherein said plastic substrate is polycarbonate.

* * * * *